May 21, 1968  H. R. WILSON  3,384,214
DUAL PISTON CLUTCH
Filed April 16, 1965  3 Sheets-Sheet 1
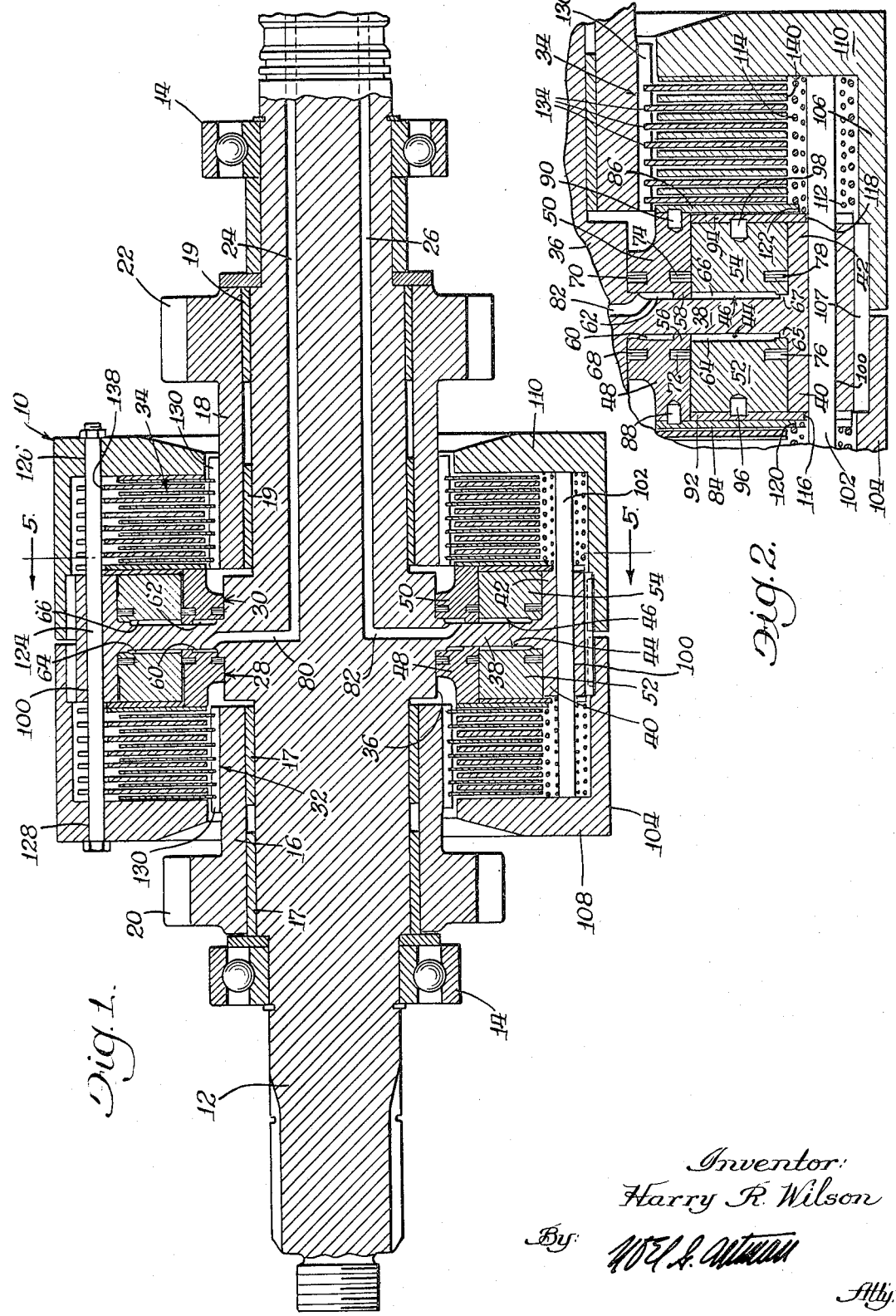
Inventor:
Harry R. Wilson
By
Atty.

May 21, 1968
H. R. WILSON
3,384,214
DUAL PISTON CLUTCH
Filed April 16, 1965
3 Sheets-Sheet 2
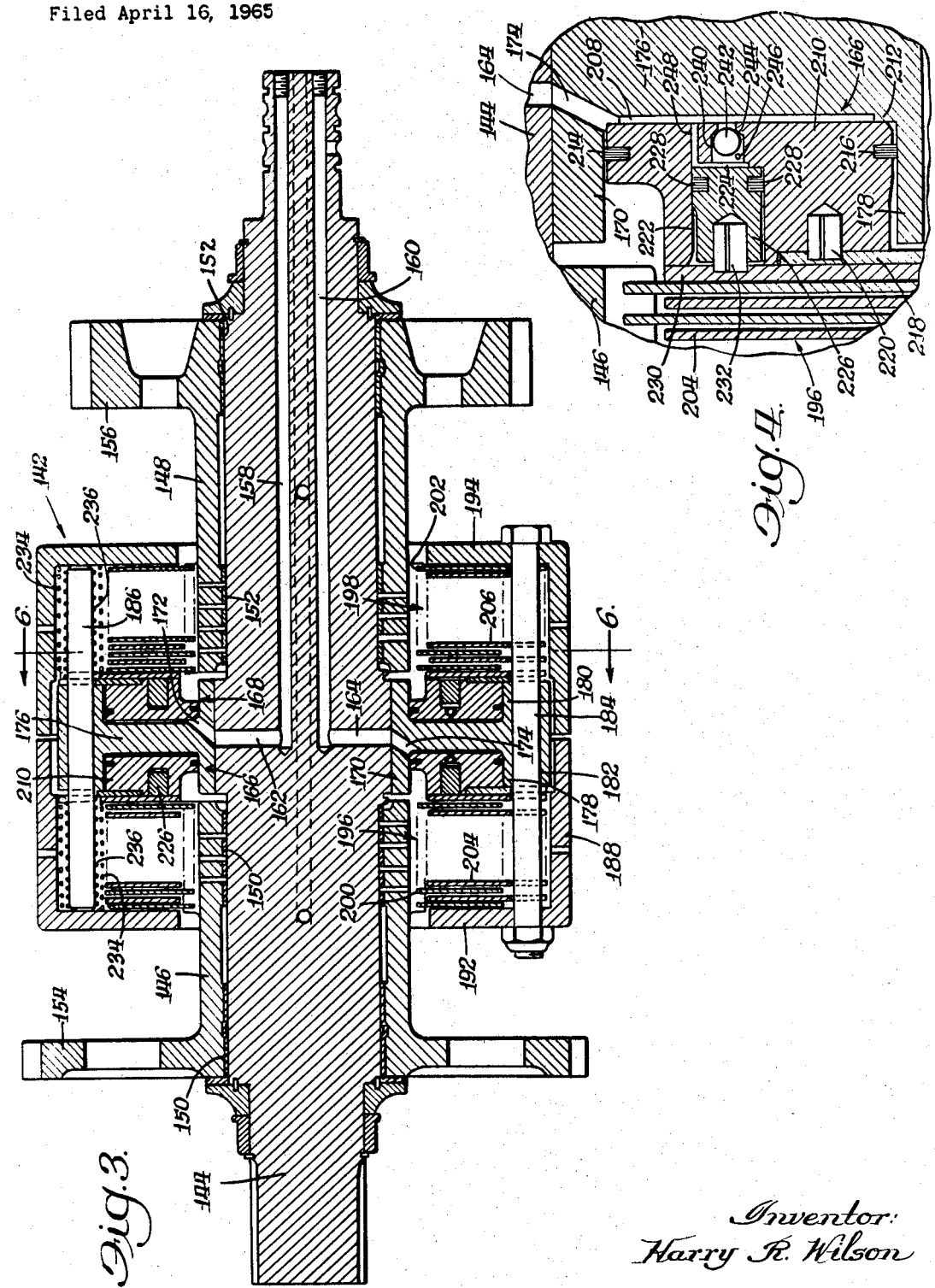
Inventor:
Harry R. Wilson

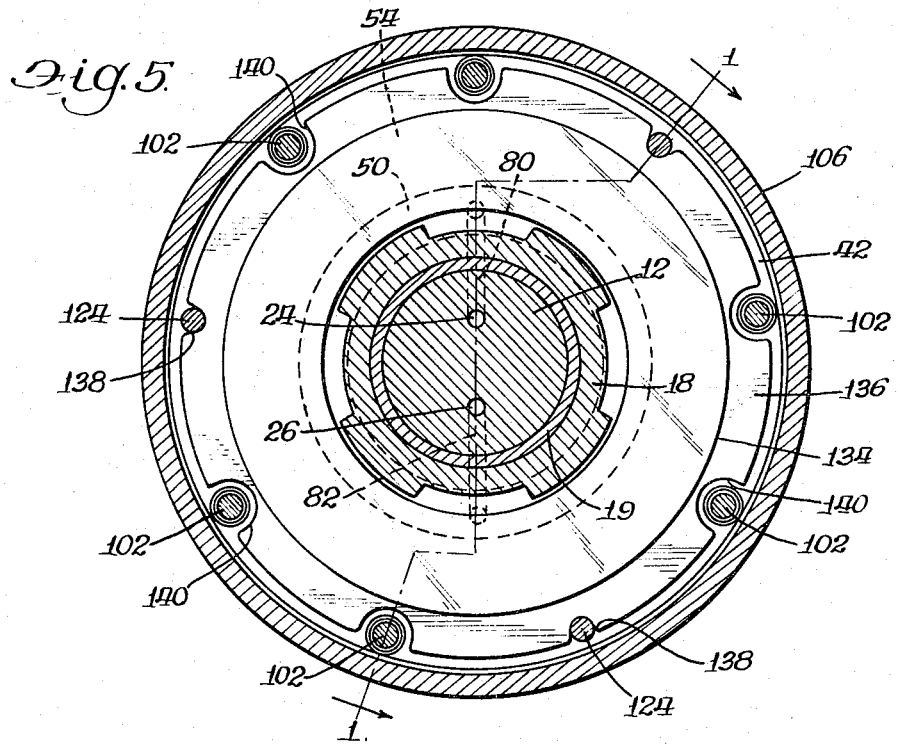
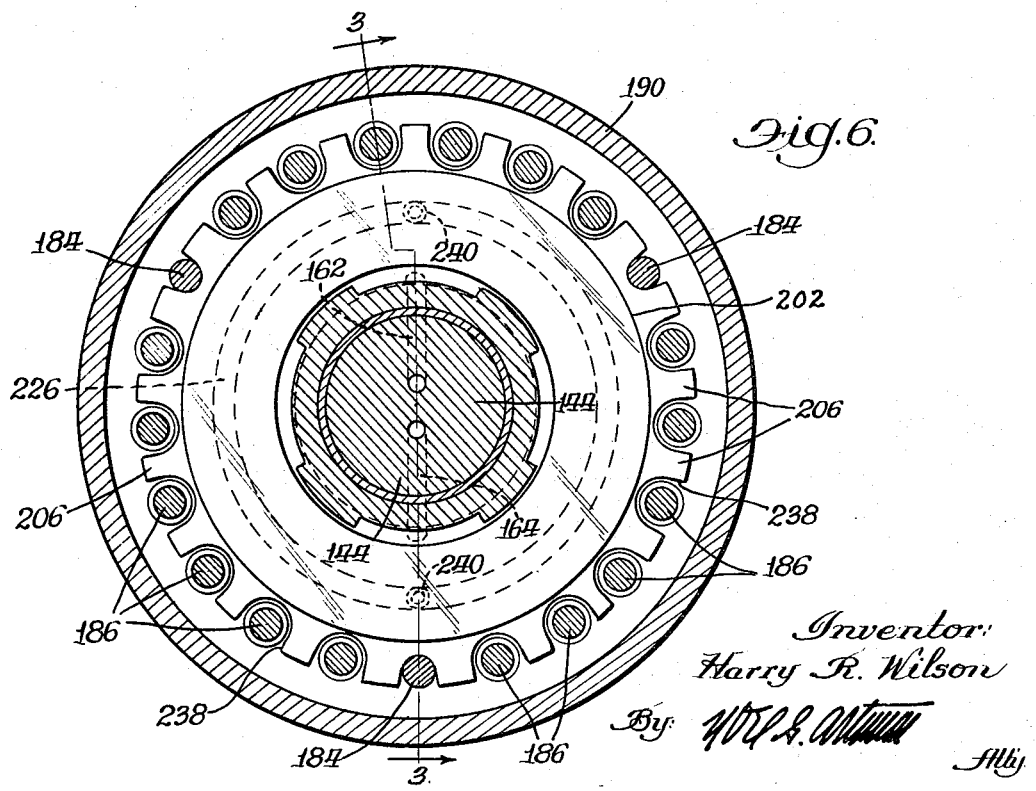

United States Patent Office 3,384,214
Patented May 21, 1968

---

3,384,214
DUAL PISTON CLUTCH
Harry R. Wilson, Libertyville, Ill., assignor to International Harvester Company, a corporation of Delaware
Filed Apr. 16, 1965, Ser. No. 448,821
3 Claims. (Cl. 192—87.11)

This invention relates to hydraulically operated clutches and more particularly relates to hydraulically operated dual piston clutches for power shift transmissions and the like.

Among the objectives in the design of hydraulically operated clutches for power shift transmissions have been those of providing a simple and efficient clutch which will effect rapid, full power shifting with a minimum of shifting shocks. Previous attempts to satisfy these objectives have resulted in bulky clutches with complicated components and many working parts which are subject to early failure. Furthermore, these clutches have not provided a power shift device which will afford rapid and shock free transition from one gear ratio to another.

Accordingly, it is an object of this invention to provide an improved hydraulically operated clutch with a pair of annular pistons arranged to selectively engage and disengage the clutch in a rapid and smooth operation.

It is another object of this invention to provide a dual piston actuator for a power transmitting clutch in which a shock free engagement is effected by initially engaging one of the pistons with subsequent engagement of both pistons for full power transmission.

It is another object of this invention to provide an efficient clutch mechanism incorporating a pair of interfitting concentric annular pistons within an annular fluid chamber in which initial fluid pressure operates one of the pistons for initial clutch engagement; in which movement of the one piston operates to introduce fluid to the other piston; and in which the other piston moves under full fluid pressure for final engagement of the clutch.

Still another object of this invention is to provide an improved clutch mechanism for a power shift transmission in which a main piston is slidably carried within an annular chamber adjacent the clutch pack; in which a primary piston is slidably carried within an annular chamber in the main piston; and in which fluid pressure delivered to both chambers operates to initially engage the primary piston and to finally engage the main piston with the clutch pack in a short period of time.

Still another object of this invention is to provide a clutch mechanism for a power shift transmission in which a primary piston is carried within a main piston; in which the primary piston moves under fluid pressure to intially engage the clutch pack; in which subsequent movement of the main piston will close a check valve in the passageway leading to the primary piston; and in which the normal force acting on the clutch pack will be rapidly developed as a function of the area of the main piston and the regulated circuit pressure.

Another object of this invention is to provide a quick shift piston for a hydraulically operated power transfer clutch in which a primary piston moves initially within a main piston to engage the clutch pack; in which subsequent movement of the main piston will close a check valve in a passageway between the primary piston and the main piston; and in which a bleed orifice will allow fluid communication between the primary and main pistons so that the main piston will fully engage the clutch pack.

Other objects and advantages of the present invention will become apparent to those skilled in the art when the following specification is read in conjunction with the accompanying drawings in which:

FIGURE 1 is a longitudinal cross-sectional view of a hydraulically operated clutch embodying features of the present invention and taken along the line 1—1 of FIGURE 5;

FIGURE 2 is an enlarged cross-sectional view of component parts of the hydraulically operated clutch of FIGURE 1 showing features of the dual piston assembly and clutch pack members;

FIGURE 3 is a longitudinal sectional view of a modified form of the hydraulically operated clutch of this invention taken along the line 3—3 of FIGURE 6;

FIGURE 4 is an enlarged sectional view of component parts of the modified form of FIGURE 3 showing features of the dual piston assembly and clutch pack members;

FIGURE 5 is a cross-sectional end view of the clutch mechanism of the invention taken along the line 5—5 of FIGURE 1; and FIGURE 6 is a cross-sectional end view of the modified form of the clutch mechanism of the invention taken along the line 6—6 of FIGURE 3.

Referring now to the drawings, and particularly to FIGURES 1, 2 and 5 a hydraulically operated dual piston clutch shown generally by the reference numeral 10 is mounted coaxially with power input shaft 12, which in turn is rotatably mounted in a conventional manner on external support members by means of ball bearings 14. A pair of tubular power output shafts 16 and 18 are coaxial with, and rotatably mounted on, input shaft 12 by means of sleeve bearings 17 and 19. A pair of spur gears 20 and 22 are respectively formed on shafts 16 and 18 and are in continuous driving engagement with conventional gearing (not shown), such as forward and reverse or high and low speed gears. A pair of axial bores 24 and 26 are provided at one end of input shaft 12 and permit hydraulic fluid communication between conventional hydraulic pumps and control valves (not shown) and the clutch assembly 10.

The clutch assembly 10 consists of a pair of dual piston assemblies 28 and 30 which are responsive to fluid pressure directed through bores 24 and 26 and which selectively engage and disengage clutch packs 32 and 34 respectively for a driving connection of the input shaft 12 with a selected one of the output shafts 16 or 18.

An enlarged annular portion 36 is integrally formed on input shaft 12 intermediate shafts 16 and 18. Web portion 38 is integral with the annular portion 36 and extends outwardly therefrom in a radial direction. A pair of annular flange portions 40 and 42 are integral with the web portion 38 and are radially spaced from the enlarged annular portion 36 to define a pair of annular chambers 44 and 46 which respectively open towards either of the clutch pack assemblies 32 and 34. A pair of annular primary pistons 48 and 50 are slidably mounted on the inner periphery of annular chambers 44 and 46 respectively for movement to and from the clutch pack assemblies 32 and 34. A pair of annular main pistons 52 and 54 are coaxial with primary pistons 48 and 50 and are slidably mounted within the chambers 44 and 46 between the outer surface of primary pistons 48 and 50 and the inner surfaces of flanges 40 and 42. Annular abutments 56 and 58 are integral with the outer periphery of primary pistons 48 and 50 respectively and extend axially toward web portion 38 to divide the annular chambers 44 and 46 into first chamber sections 60 and 62 and second chamber sections 64 and 66 spaced radially outwardly from the first chamber sections. Annular abutments 65 and 67 are integral with web portion 38 and function to space pistons 52 and 54 from the respective surfaces of the web portion.

A fluid tight fit is provided for the chambers 44 and 46 by means of: a pair of annular seal rings 68 and 70 mounted in grooves cut in the inner surface of primary pistons 48 and 50 and bearing against the outer surface of enlarged portion 36; a pair of annular seal rings 72 and 74 mounted in grooves cut in the outer surface of primary pistons 48 and 50 and bearing against the inner surface of main pistons 52 and 54; and a pair of annular seal rings 76 and 78 mounted in grooves cut in the outer surface of main pistons 52 and 54 and bearing against the inner surface of flange portions 40 and 42.

Input shaft 12 is provided with a bore 80 which extends radially outwardly from bore 24 through enlarged portion 36, through web portion 38, and into fluid communication with first chamber section 60. Similarly, a bore 82 extends radially outwardly in input shaft 12 from bore 26 through enlarged portion 36, web portion 38, and into fluid communication with first chamber section 62.

A pair of annular spring retaining plates 84 and 86 are rigidly secured to the working faces of primary pistons 48 and 50 respectively by a plurality of retaining pins 88 and 90. Similarly, a pair of annular spring retaining plates 92 and 94 are rigidly secured to the working faces of main pistons 52 and 54 respectively by retaining pins 96 and 98. The axial dimension of primary pistons 48 and 50 extends an appropriate amount beyond pistons 52 and 54 to permit plates 84 and 86 to overlap plates 92 and 94.

A total of nine axially extending circumferentially spaced bores 100 are provided through the annular flange portions 40 and 42. Six bolts 102 are fitted in circumferentially spaced pairs of the bores 100. Drum shaped annular cover portions 104 and 106 are secured to the outer surfaces of the flange portions 40 and 42 for rotation therewith by suitable means such as axially extending circumferentially spaced splines 107. A pair of annular end portions 108 and 110 are integral with and extend radially inwardly from the cover portions 104 and 106. The ends of guide pins 102 abut against the inner surfaces of either of the end portions 108 and 110. Adequate clearance is provided at the inner margins of end portions 108 and 110 and the output shafts 16 and 18 to allow for relative rotation therebetween.

Each of the guide pins 102 has coaxial therewith an inner compression spring 112 and an outer compression spring 114 (FIGURE 2). One end of spring 112 abuts against the end portion 110 and the other end abuts against the surface of spring retainer plate 94. Spring 114 circumscribes spring 112 and abuts at its one end against end portion 110 while its other end abuts against retainer plate 86. The springs 112 urge main piston 54 from the clutch pack 34 to its seated position in chamber 46 with a first predetermined force. The springs 114 have a lighter force as compared with springs 112 and urge primary piston 50 from the clutch pack 34 to its seated position with a second predetermined force less than the first predetermined force. Alternatively, the same effect may be achieved by providing a greater number of springs 112 as compared to the number of springs 114. Retaining plates 92 and 94 are provided with axial slots 116 and 118 to permit relative axial movement along guide pin 102. Similarly, retaining plates 84 and 86 are provided with axial slots 120 and 122 to permit relative axial movement with inner compression springs 112.

Three axially disposed circumferentially spaced bolts 124 are positioned in the remaining bores 100 of the flange portions 40 and 42. These bolts extend through corresponding bores 126 and 128 of end portions 108 and 110, and serve to rigidly hold the cover portions 104 and 106, the guide pins 102, and springs 112 and 114 as a composite assembly for rotation with the input shaft.

The clutch pack assemblies 32 and 34 consist of conventional annular clutch disks which are interleaved and rotate together as a unit when axially compressed together. A plurality of axially disposed circumferentially spaced splines 130 are provided on the outer periphery of the output shafts 16 and 18. A plurality of annular clutch disks 134, which are composed of a suitable friction engaging material such as bronze, are provided with internal teeth fitted on the splines 130 and are axially spaced along the output shafts 16 and 18 for rotation therewith. The clutch disks 134 are mounted for axial movement along the splines 130. A plurality of axially spaced annular clutch disks 136, which are composed of a suitable material such as steel, are interleaved with clutch disks 134. Three notches 138 are provided in each clutch disk and are in locking relationship with respective bolts 124. Additionally, a tooth and spline connection can be provided between clutch plates 136 and cover portions 104 and 106. The clutch disks 136 thus are mounted for rotation with input shaft 12, and are axially slidable with respect thereto. Six notches 140 are provided in each clutch disk 136 to provide sufficient clearance for sliding axial movement in relationship to outer compression springs 114.

In operation, assuming that no power delivery is required by the clutch assembly 10, the external hydraulic controls are operated so that no fluid pressure is present in either of the bores 24 and 26. In this condition springs 112 and 114 will urge the primary pistons 48 and 50 and the main pistons 52 and 54 to the seated position as shown in FIGURE 2. The clutch disks 134 will thus be free for relative rotation with respect to disks 136.

For transfer of power from input shaft 12 to output shaft 18 and spur gear 22, the external controls are manipulated to direct fluid pressure to bores 26 and 82 into the first chamber section 62. The increasing fluid pressure acting on the inner face of primary piston 50 will overcome the force of the six springs 114 and the piston 50 will come into initial contact, through plate 86, with the clutch disks 134 and 136 which will now begin to be compressed together in an axial direction. Concurrently with this action the annular abutment 58 will move away from the web portion 38 and direct fluid into the second chamber section 66. The force of the fluid in chamber section 66 acting against the effective area of main piston 54 will now overcome the compressive force of the six springs 112 and move the main piston to engagement towards the clutch pack. Because the springs 112 have a greater compressive force as compared to springs 114, the piston 54 will move to engage the clutch pack 34 after initial engagement thereof by primary piston 50. This initial engagement by primary piston 50 will "set" the clutch pack 34 before full engagement by the main piston 54, and thereby will provide a time lag between the engagement of the two pistons. Shifting shock of the clutch assembly is thereby eliminated and smooth operation of the clutch is obtained.

For disengagement of the clutch assembly the fluid pressure in bores 26 and 82 and chamber 46 is reduced. Springs 112 and 114 will now urge pistons 54 and 50 to their seated position, and clutch disks 134 and 136 will no longer be in frictional engagement.

In a similar manner gear 20 and output shaft 16 are rotated with input shaft 12 through engagement of clutch pack 32. This is accomplished by external manipulation of the hydraulic controls to increase fluid pressure in bore 24. The initial engagement of primary piston 48 followed by the subsequent engagement of main piston 52 with the clutch pack 32 is identical to that described above with respect to clutch pack 34.

FIGURES 3, 4 and 6 illustrate a modified clutch assembly 142 of the present invention. The power input shaft 144 is rotatably mounted in a conventional manner on an external support. Annular power output shafts 146 and 148 are rotatably supported by means of sleeve bearings 150 and 152 respectively. Spur gears 154 and 156 are integral with output shafts 146 and 148 respectively and may be in constant engagement with gearing (not shown) in the transmission. A pair of axial bores 158 and 160 are connected with external hydraulic controls (not shown) and direct hydraulic fluid through radial bores 162 and 164 to the dual piston assemblies 166 and 168. An annular hub portion 170 is keyed to input shaft 144 for rotation therewith. A pair of bores 172 and 174 are drilled through the hub portion and provide fluid communication between radial bores 162 and 164 and piston assemblies 168 and 166, respectively. A radially extending web portion 176 is integral with hub portion 170 and rigidly supports axially extending flange portions 178 and 180.

A total of twenty-one axially disposed circumferentially spaced bores 182 are drilled through the flange portions 178 and 180. Three bolts 184 are mounted in a selected three of the bores 182 equally spaced around the circumference of the clutch assembly. Guide pins 186 are mounted in the remaining bores 182. A pair of annular cover portions 188 and 190 with radially inwardly extending end portions 192 and 194, respectively, are mounted about the flange portions 178 and 180 and are secured for rotation with input shaft 144 by bolts 184. The cover portions 188 and 190 enclose clutch pack assemblies 196 and 198.

The clutch pack assemblies 196 and 198 are constructed in a like manner to that described with respect to FIGURES 1 and 2. Thus, clutch pack assemblies 196 and 198 consist respectively of a plurality of annular clutch disks 200 and 202 which are splined on output shafts 146 and 148 for rotation therewith and which are slidable in an axial direction along the splines. A plurality of annular clutch disks 204 and 206 are interleaved with the clutch disks 200 and 202 and are mounted on bolts 184 for axial sliding movement therewith and for rotation with input shaft 144.

FIGURE 4 shows details of the dual piston clutch assembly 166. An annular chamber 208 is defined by the outer surface of hub portion 170, the face of web portion 176, and the inner surface of flange 178. An annular main piston 210 is slidably mounted in the chamber 208 for movement to and from the clutch pack 196. The annular abutment 212 formed integral with the web portion 176 maintains a spaced relationship between main piston 210 and the outer surface of the web portion. Annular seal rings 214 and 216 disposed in annular grooves cut in main piston 210 maintain a fluid tight seal for chamber 208. The annular spring retaining plate 218 is secured to the outer face of main piston 210 by suitable means such as retaining pins 220. An annular groove 222 is formed near the inner margins of main piston 210 and faces outwardly towards the clutch pack 196. This groove forms a chamber 224 into which an annular primary piston 226 is mounted for sliding movement to and from the clutch pack 196. A pair of annular seal rings 228 are disposed in annular grooves cut in the primary piston 226 and form a fluid tight seal for chamber 224. An annular spring retaining plate 230 is rigidly secured to the outer face of piston 226 by suitable means such as retaining pins 232.

The pistons 210 and 226 are urged from the clutch pack 196 to a seated position as shown in FIGURE 4 by springs in the manner identical to that disclosed in connection with FIGURE 2. Thus, compression springs 236 (FIGURE 3) are coaxial with pins 186 and seat against end portion 192 and plates 218 to urge main piston 210 to the seated position with a first predetermined force. Compression springs 234 are mounted coaxial with pins 186 and within springs 234 to seat against end portion 192 and plate 230. The springs 234 have a lighter force as compared to springs 236 and urge primary piston 226 to the seated position of FIGURE 4 with a second predetermined force less than the first predetermined force. Notches 238 are provided in clutch disks 204 and 206 to maintain adequate clearance around the springs 234.

A pair of diametrically opposed bores 240 are provided in main piston 210 to permit fluid communication from chamber 208 to chamber 224. A check valve consisting of ball 242 seated on annular shoulder 244 is provided in each bore 240 to prevent fluid flow from chamber 224 back into chamber 208. A wire portion 246 is mounted transversely across the bore 240 at the outer margin thereof with respect to the axis of rotation of input shaft 144. Wire portion 246 will prevent the ball 240 from moving out of its check valve position during rotation of the clutch assembly.

For neutral operation of the clutch assembly 142 the external hydraulic controls are manipulated so that no pressure is present in either of bores 158 or 160 so that both the main and primary pistons of the piston assemblies 166 and 168 are in their seated positions. The clutch pack assemblies 196 and 198 will therefore be disengaged and no torque will be delivered from input shaft 144 to either of the output shafts 146 and 148.

For delivery of power from input shaft 144 to the output shaft 146 and gear 154, the external hydraulic controls are manipulated so that fluid pressure is delivered to bores 160, 164, 174 and into chamber 208. Fluid under pressure will now flow through bores 240 into the primary chamber 224. The pressure in chamber 224 acting against primary piston 226 will overcome the compressive force of springs 234 with the result that the piston 226 and retaining plate 230 will move into initial engagement with the clutch pack 196 to set the clutch plates. The force on the clutch pack 196 will now equal the hydraulic pressure in chamber 224 multiplied by the effective area of the primary piston 226 minus the combined force of the springs 234. This low normal force for initial engagement of the clutch pack 196 will prevent shifting shocks and will provide a smooth operation for the clutch assembly. Pressure in the main chamber 208 will now rise to a higher value and the main piston 210 will move against the force of the heavy springs 236. The check valve ball 242 will now seat against shoulder 244 upon reverse flow of fluid through bore 240. At this stage the main piston 210 has not yet engaged the clutch pack 196, but the pressure in the primary chamber 224 will rise to a value equal to the full regulated circuit pressure of the system multiplied by the ratio of the effective area of the main piston to the effective area of the primary piston. The normal force engaging the clutch pack 196 will thus equal the full regulated circuit pressure multiplied by the effective area of the main piston minus the combined force of the springs 234 and 236. The full force of the clutch assembly acting on the clutch packs is achieved in a very short time after the initial engagement of the clutch. This is accomplished by the fact that the main piston 210 need only move a short distance until ball 242 seats before the full normal force on the clutch pack 196 is obtained.

To reduce the pressure in chamber 224 during engagement of the clutch assembly and thereby minimize the strain on ring seals 228, an orifice 248 is provided between chamber 224 and chamber 208. This orifice 248 is effective to bleed fluid from chamber 224 around check valve ball 242 into chamber 208 at a controlled rate of flow. Main piston 210 will now compress the springs and move towards the clutch pack 196 relative to primary piston 226 to bear fully against the clutch pack 196. The pressure in the primary chamber 224 will reduce to the regulated circuit pressure, while the normal force acting on the clutch plate 196 will remain equal to the regulated circuit pressure multiplied by the effective area of the main piston minus the combined force of the springs 234 and 236.

To disengage the clutch pack 196 the external hydraulic control is manipulated to drop the fluid pressure in bore 160 and chamber 208. The return springs 234 and 236 will now urge pistons 226 and 210 to their seated positions as shown in FIGURE 4. The plurality of clutch disks 204 will now rotate freely relative to clutch disks 200. Where disengagement is desired after the primary piston 226 has extended, but before the main piston 219 has moved to the clutch pack 196, the check valve ball 242 will be forced to unseat by centrifugal force acting on it as the clutch rotates and the primary piston will be free to move to its seated position.

Selective engagement and disengagement of clutch pack assembly 198 to rotate output shaft 148 and gear 156 with input shaft 144 is accomplished in a similar manner to that described above. Thus, directing fluid under pressure to bores 158, 162, and 172 will operate dual piston assembly 168 for initial engagement or "set" of clutch pack 198 followed by full engagement thereof in a short period of time.

It will be understood that various changes in the details, material, steps and arrangement of parts, which have been described and illustrated in order to explain the nature of the invention, may be made by those skilled in the art within the principle and scope of the invention as expressed in the appended claims.

What I claim is:

1. In a power transmitting clutch having an input shaft, at least one output shaft and a clutch pack operative to hold the output shaft for rotation with the input shaft, the combination including: a housing mounted adjacent the clutch pack, the housing having a first annular fluid chamber axially spaced from the clutch pack; a source of fluid under pressure; means to connect the source of fluid with the chamber; a first annular piston mounted in the first chamber for axial movement to and from the clutch pack; means to resiliently urge the first piston from the clutch pack with a first predetermined force; the first piston having a second annular chamber; a second annular piston mounted in the second chamber for axial movement to and from the clutch pack; means to resiliently urge the second piston from the clutch pack with a second predetermined force less than the first force; means to direct fluid from the first chamber to the second chamber; and, means to create a temporary hydraulic lock in the second chamber responsive to movement of the first piston to the clutch pack.

2. In a power transmitting clutch having an input shaft, at least one output shaft and a clutch pack operative to hold the output shaft for rotation with the input shaft, the combination including: a housing enclosing the clutch pack, the housing having a first annular fluid chamber axially spaced from the clutch pack; a source of fluid under pressure; means to connect the source of fluid with the chamber; a first annular piston mounted in the first chamber for axial movement to and from the clutch pack; a first annular retaining plate rigidly connected with the first piston adjacent the clutch pack; a plurality of springs engaging the first plate to resiliently urge the first piston from the clutch pack with a first predetermined force; the first piston having a second annular fluid chamber; a second annular piston mounted in the second chamber for axial movement to and from the clutch pack; a second annular retaining plate rigidly connected with the second piston; a plurality of springs engaging the second plate to resiliently urge the second piston from the clutch pack with a second predetermined force less than the first force; means to direct fluid from the first chamber to the second chamber; means to block fluid flow from the second chamber to the first chamber responsive to initial movement of the first piston to the clutch pack; and, means to bleed fluid from the second chamber to permit the first piston to complete its movement to the clutch pack.

3. In a power transmitting clutch having an input shaft, at least one output shaft and a clutch pack operative to hold the output shaft for rotation with the input shaft, the combination including: a housing mounted adjacent the clutch pack, the housing having a first annular fluid chamber axially spaced from the clutch pack; a source of fluid under pressure; means to connect the source of fluid with the chamber; an annular main piston mounted in the first chamber for axial movement to and from the clutch pack; means to resiliently urge the main piston from the clutch pack with a first predetermined force; the main piston having a second annular chamber; an annular primary piston mounted in the second chamber for axial movement to and from the clutch pack; means to resiliently urge the primary piston from the clutch pack with a second predetermined force less than the first force; one-way valve means to permit fluid flow from the first chamber to the second chamber; and orifice means to bleed fluid from the second chamber to the first chamber at a predetermined rate.

References Cited

UNITED STATES PATENTS

| | | | |
|---|---|---|---|
| 2,386,220 | 10/1945 | Lawler et al. | |
| 2,916,122 | 12/1959 | Hindmarch | 192—109 X |
| 3,199,648 | 8/1965 | Schwab | 192—86 X |
| 3,237,404 | 3/1966 | Flanigan et al. | 192—113.2 X |
| 3,245,507 | 4/1966 | Hilpert | 192—109 X |
| 3,262,531 | 7/1966 | Black et al. | 192—109 X |

FOREIGN PATENTS

| | | |
|---|---|---|
| 654,453 | 6/1951 | Great Britain. |

BENJAMIN W. WYCHE III, *Primary Examiner.*

MARK NEWMAN, *Examiner.*